(12) United States Patent
Graham et al.

(10) Patent No.: US 12,241,344 B2
(45) Date of Patent: Mar. 4, 2025

(54) MULTIPLE POSITION SLEEVE SYSTEM FOR IMPROVED WELLBORE INJECTION

(71) Applicant: Schlumberger Technology Corporation, Sugar Land, TX (US)

(72) Inventors: Robert Matthew Graham, Houston, TX (US); Joshua Susmarski, Denver, CO (US); Houssem Kharrat, Houston, TX (US); Laurent Alteirac, Missouri City, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/248,715

(22) PCT Filed: Oct. 11, 2021

(86) PCT No.: PCT/US2021/054391
§ 371 (c)(1),
(2) Date: Apr. 12, 2023

(87) PCT Pub. No.: WO2022/081465
PCT Pub. Date: Apr. 21, 2022

(65) Prior Publication Data
US 2023/0407732 A1    Dec. 21, 2023

Related U.S. Application Data

(60) Provisional application No. 63/090,480, filed on Oct. 12, 2020.

(51) Int. Cl.
*E21B 43/12* (2006.01)
*E21B 34/14* (2006.01)
(Continued)

(52) U.S. Cl.
CPC ............ *E21B 43/12* (2013.01); *E21B 34/142* (2020.05); *E21B 43/14* (2013.01); *E21B 43/26* (2013.01); *E21B 2200/06* (2020.05)

(58) Field of Classification Search
CPC ........ E21B 43/12; E21B 34/142; E21B 43/14; E21B 43/26; E21B 2200/06
See application file for complete search history.

(56) References Cited

U.S. PATENT DOCUMENTS 9,068,428 B2 *   6/2015   Mazyar .................. E21B 43/28
9,127,533 B2    9/2015   Hallundbaek
(Continued)

FOREIGN PATENT DOCUMENTS

WO    2019151993 A1    8/2019

OTHER PUBLICATIONS

International Search Report and Written Opinion issued in the PCT Application PCT/US2021/054391, dated Jan. 28, 2022 (9 pages).
(Continued)

*Primary Examiner* — Aaron L Lembo
(74) *Attorney, Agent, or Firm* — Jeffrey D. Frantz

(57) ABSTRACT

A technique facilitates both a fracturing operation and a subsequent production operation in, for example, a geothermal well system. According to an embodiment, a geothermal well completion is deployed downhole into a wellbore. The geothermal well completion comprises a tubular section deployed in a well zone and having a fracturing port and a production port. Additionally, a shiftable tool is disposed in the tubular section. The shiftable tool comprises a sleeve system which is selectively shiftable between a plurality of operational flow positions. In some embodiments, a plurality of the shiftable tools may be used along corresponding well zones to facilitate fracturing of the well zones while also (Continued)

ensuring the outflow of production fluid has a desired balance along the plurality of well zones.

9 Claims, 3 Drawing Sheets

(51) Int. Cl.
   *E21B 43/14* (2006.01)
   *E21B 43/26* (2006.01)

(56) References Cited

U.S. PATENT DOCUMENTS

| | | | |
|---|---|---|---|
| 10,082,007 B2 * | 9/2018 | Broussard | E21B 43/045 |
| 10,113,390 B2 | 10/2018 | Langlais | |
| 10,335,858 B2 * | 7/2019 | Xu | B22F 7/02 |
| 10,619,457 B2 | 4/2020 | Filippov | |
| 11,226,137 B2 * | 1/2022 | O'Malley | E21B 34/08 |
| 11,959,666 B2 * | 4/2024 | Fleckenstein | F24T 10/20 |
| 2007/0223999 A1 | 9/2007 | Curlett | |
| 2009/0056934 A1 | 3/2009 | Xu | |
| 2009/0084553 A1 * | 4/2009 | Rytlewski | E21B 43/08 |
| | | | 166/305.1 |
| 2013/0168099 A1 | 7/2013 | Themig | |
| 2013/0333891 A1 * | 12/2013 | Fripp | E21B 43/26 |
| | | | 166/302 |
| 2015/0300327 A1 | 10/2015 | Sweatman | |
| 2019/0242216 A1 | 8/2019 | Watson | |
| 2023/0022332 A1 * | 1/2023 | Macphail | E21B 43/12 |

OTHER PUBLICATIONS

International Preliminary Report on Patentability issued in the PCT Application PCT/US2021/054391 dated Apr. 27, 2023, 6 pages.

* cited by examiner

MULTIPLE POSITION SLEEVE SYSTEM FOR IMPROVED WELLBORE INJECTION

CROSS-REFERENCE TO RELATED APPLICATIONS

The present application is a national stage entry under 35 U.S.C. 371 of International Application No. PCT/US2021/054391, filed Oct. 11, 2021, which claims priority benefit of U.S. Provisional Application No. 63/090,480, filed Oct. 12, 2020, the entirety of which is incorporated by reference herein and should be considered part of this specification.

BACKGROUND

In many countries, geothermal energy plants have become more common. Geothermal energy plants use the energy from water heated deep below the surface of the earth to power turbines which can be used in the production of electricity. In some applications, production wellbores are drilled deep into the geothermal formation to provide a path through which the hot water may flow to the surface. This hot water may be used in the production of steam for powering turbines which, in turn, power generators for generating electricity. Once used, the cooler fluid may be returned and injected into the geothermal formation via an injection wellbore. By fracturing the geothermal formation, an efficient flow loop is created between the injected fluid and the produced fluid to ensure continued production of hot water to the surface. Various types of completion equipment have been employed in the injection wellbore to enable fracturing of the surrounding geothermal formation and subsequent outflow of production fluid. However, existing systems and techniques can involve substantial additional equipment combined with various intervention techniques which can increase the time and cost associated with fracturing and subsequent production.

SUMMARY

In general, a system and methodology are provided for combining functions in a single tool, which enables both a fracturing operation and a subsequent production operation in, for example, a geothermal well system. According to an embodiment, a geothermal well completion is deployed downhole into a wellbore, e.g., an injection wellbore. The geothermal well completion comprises a tubular section deployed in a well zone and having a fracturing port and a production port. Additionally, a shiftable tool is disposed in the tubular section. The shiftable tool comprises a sleeve system, which is selectively shiftable between a plurality of operational positions. The operational positions may include an off position closing off the fracturing port and the production port; a hydraulic fracturing position which opens the fracturing port while the production port remains closed; and a production flow position which closes off the fracturing port and opens the production port to enable outflow of injected production fluid. In some embodiments, a plurality of the shiftable tools may be used along corresponding well zones to facilitate fracturing of the well zones while also ensuring the outflow of production fluid has a desired balance along the plurality of well zones.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
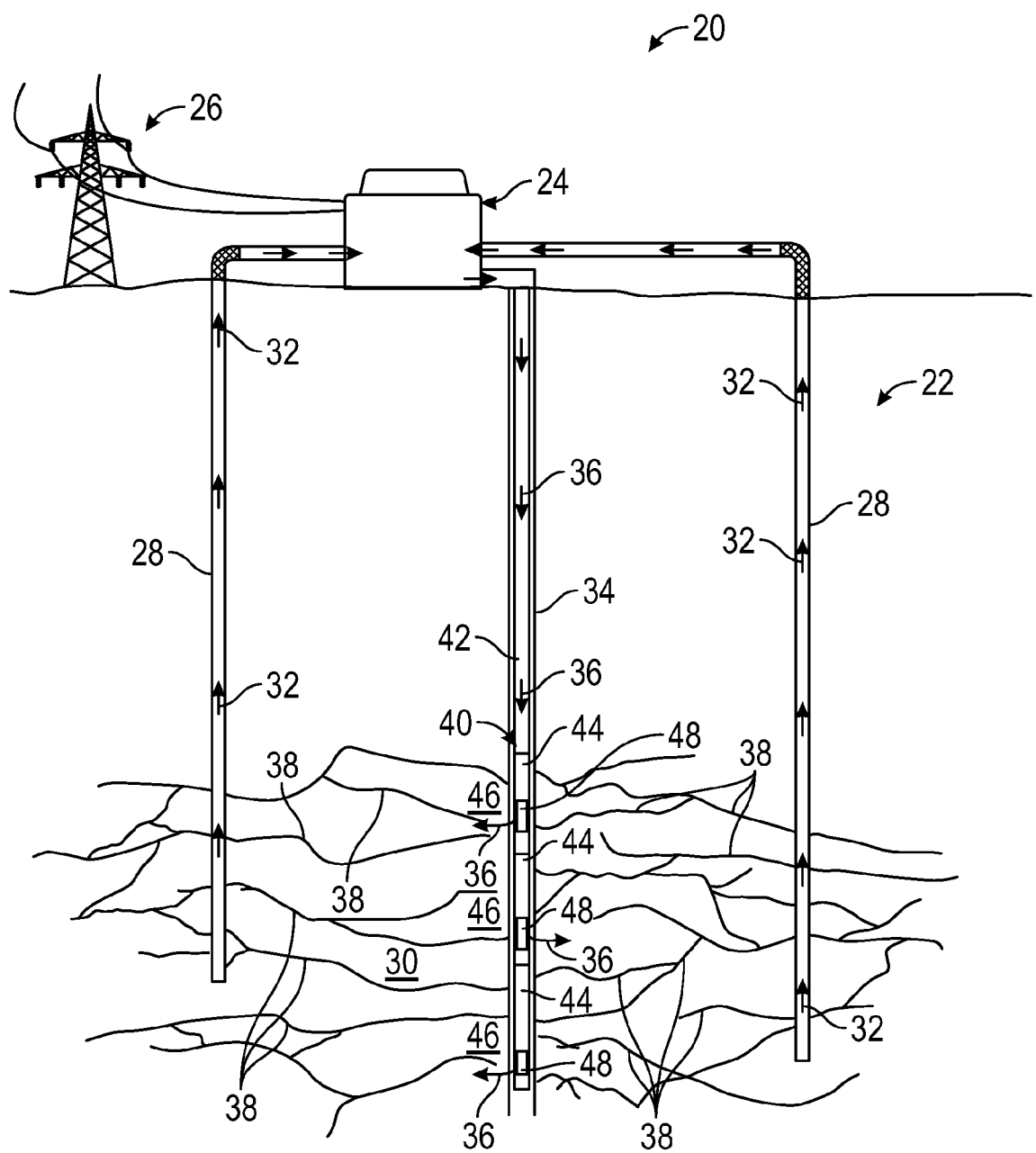
FIG. 1 is a schematic illustration of an example of a geothermal well system having completion equipment deployed in an injection wellbore, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology for combining functions in a single tool so as to enable both a fracturing operation and a subsequent production operation in a geothermal well system or other type of well system. In a geothermal well system, fluid, e.g. water, is heated in a hot geothermal formation. For example, water in the geothermal formation may be heated by magma found deep beneath the surface. The hot fluid may be pumped to the surface via production wellbores, and this hot fluid becomes steam or is turned to steam used to drive turbines that power electric generators in a power plant. The steam may then be recycled and turned back to water, which is pumped back down into the geothermal formation via an injection wellbore. As the returned water is injected into the hot geothermal formation, this production water is once again heated and available for return to the surface via the production wellbores. By fracturing the geothermal formation, flow from the injection wellbore to the production wellbores is facilitated to ensure this loop is continued.

According to an embodiment, a geothermal well completion is deployed downhole into a wellbore, e.g., into an injection wellbore. The geothermal well completion comprises a tubular section deployed in a well zone and having a fracturing port and a production port. The fracturing port and the production port may each be a single port or a plurality of ports. Additionally, a shiftable tool is disposed in the tubular section. The shiftable tool may comprise a sleeve system which is selectively shiftable between a plurality of operational positions.

The operational positions may include an off position closing off the fracturing port and the production port; a hydraulic fracturing position which opens the fracturing port while the production port remains closed; and a production flow position which closes off the fracturing port and opens the production port to enable outflow of injection/production fluid. In various embodiments, a plurality of the shiftable tools may be used along corresponding well zones to facilitate fracturing of the well zones while also ensuring the outflow of production fluid has a desired balance along the plurality of well zones. For example, the production ports at a plurality of well zones may be sized to ensure that the production flow back into the geothermal formation is relatively even, thus providing an efficient heat cycling of the production fluid. In other words, the even flow of fluid back into the hot geothermal formation along a plurality of well zones (rather than at a concentrated location) ensures a rapid and balanced reheating of the production fluid.

Embodiments described herein effectively combine two aspects of well system operation by enabling hydraulic fracturing and subsequent production without utilizing different equipment and additional intervention trips downhole. It should be noted that certain downhole operations utilize balls which are dropped onto corresponding ball seats to enable shifting of a device by pressuring up the completion string. However, the use of balls can limit the number of stages/well zones which may be uniquely controlled. Accordingly, certain embodiments described herein reduce or eliminate reliance on balls for performing actuation tasks downhole.

Referring generally to FIG. 1, an example of a geothermal energy system 20 is illustrated as utilizing a geothermal well system 22, which works in cooperation with a power plant 24. Power plant 24 may comprise turbines for powering generators and/or other equipment for producing electricity provided to an electrical grid 26.

In the illustrated embodiment, the geothermal well system 22 comprises at least one production wellbore 28, e.g. a plurality of production wellbores 28, drilled down into a hot geothermal formation 30. Geothermal fluid, e.g. water, is heated by the hot geothermal formation 30, and this hot fluid is produced, e.g. pumped, to the surface as indicated by arrows 32. The geothermal fluid 32 arrives at the surface as steam or is converted to steam and delivered to power plant 24 to enable electrical power generation. After use, the steam condenses and this recycled fluid is returned to the hot geothermal formation 30 via an injection wellbore 34 (or a plurality of injection wellbores 34), as indicated by arrows 36. The recycled fluid 36 is injected/produced out into the hot geothermal formation where it is once again heated and able to flow back to production wellbores 28 via fractures 38 created in the geothermal formation 30 via a fracturing operation. The production and injection wellbores 28, 34 are illustrated as generally vertical, but such wellbores may have deviated sections and may be drilled in a variety of arrangements, orientations, and configurations.

As illustrated in FIG. 1, the injection wellbore 34 is completed with a well completion 40 deployed downhole into wellbore 34. The well completion 40 may comprise a tubing string 42 having a plurality of tubular sections 44 positioned along corresponding well zones 46. Each tubular section 44 may be combined with a shiftable tool 48 which may be utilized to provide both fracturing functionality and production flow functionality.

During initial stages of well system construction, for example, the shiftable tools 48 may be selectively shifted to a fracturing configuration to allow fracturing fluid to be pumped out into the geothermal formation 30 during a fracturing operation. The fracturing operation is used to create the fractures 38 which provide fluid continuity between injection wellbore 34 and production wellbores 28. Once fractured, the shiftable tools 48 may be selectively shifted to a production configuration. The production configuration enables a desired distribution, e.g. an even distribution, of fluid 36 as it is injected/produced into the geothermal formation 30 for flow to production wellbores 28 via fractures 38.

Figure 2:
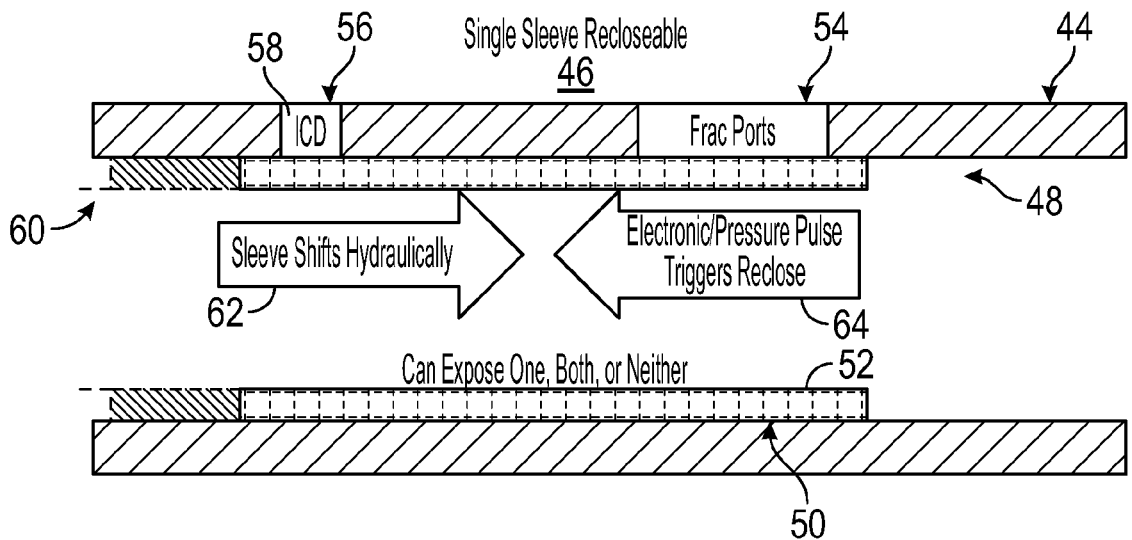
FIG. 2 is a schematic illustration of an example of a portion of a downhole completion having a tubular section and the corresponding shiftable tool operable to facilitate both fracturing operations and production operations, according to an embodiment of the disclosure.

Referring generally to FIG. 2, an example of one of the tubular sections 44 and corresponding shiftable tool 48 is illustrated. In this embodiment, the single shiftable tool 48 comprises a sleeve system 50 slidably mounted along an interior of tubular section 44. In the embodiment illustrated in FIG. 2, the sleeve system 50 comprises a single slidable sleeve 52 which may be shifted linearly along the interior of the corresponding tubular section 44.

As illustrated, the tubular section 44 comprises a fracturing port 54 and a separate production port 56. It should be noted the fracturing port 54 may comprise a single port or a plurality of ports. Similarly, the production port 56 may comprise a single port or a plurality of ports. In some embodiments, the production port 56 is established by a flow control device 58. By way of example, the flow control device 58 may be an inflow control device (ICD) which is oriented to control flow from an interior of tubular section 44 to an exterior tubular section 44. If an ICD 58 is used to define the production port 56, it may sometimes be useful to employ a screen or gravel pack to protect the ICD 58 from proppant distributed during the fracturing operation. According to an embodiment, each tubular section 44 may be constructed as a ported housing which may be threadably engaged or otherwise assembled into the overall tubing string 42 at the appropriate locations.

In the illustrated embodiment, the fracturing port 54 is larger, i.e. has a larger flow area, than the production port 56 to accommodate the higher flow rates utilized during fracturing of the surrounding well zone 46. The production port 56 is smaller so as to restrict the outflow of production fluid 36, thus enabling a desired balancing, e.g. an even balancing, of the outflow of production fluid 36 across the multiple well zones 46. In some embodiments, the area of fracturing port 54 may be at least double the area of production port 56. However, in some applications the area of fracturing port 54 may be at least three or four times the area of production port 56.

The sleeve 52 is positioned for sliding movement to enable transitioning of sleeve system 50 between a plurality of operational positions. In this embodiment, the sleeve system 50/sleeve 52 may be positioned in an off position (as illustrated) closing off the fracturing port 54 and the production port 56 so as to prevent flow between the interior and exterior of tubular section 44 during, for example, running in hole. The sleeve 52 may be shifted to transition sleeve system 50 to a hydraulic fracturing position which opens the fracturing port 54 while the production port 56 remains closed. This is the position used during fracturing of the surrounding well zone 46. Additionally, the sleeve 52 may be shifted to transition sleeve system 50 to a production flow position which closes off the fracturing port 54 and opens the production port 56 to allow outflow of production fluid 36. This latter position is used to establish the flow loop between injection wellbore 34 and production wellbores 28 during energy production.

A variety of actuation systems 60, e.g. shifting systems, may be used to enable the controlled shifting of sleeve 52. According to an example, sleeve 52 may be shifted hydraulically by routing hydraulic control lines or other hydraulic conduits down along tubing string 42 to the individual sleeves 52. In some embodiments, a smart system may be used to shift sleeve 52 based on signals received from the surface via pressure pulses sent downhole or via electrical or optical signals supplied via a control line or electronic cable. Examples of smart systems which may be used for actuating, e.g. shifting sleeve 52, include the various "smart trigger systems" available from Schlumberger Corporation and which are able to respond to electronic or pressure pulse signals to provide a desired actuation. Various combinations of systems also may be used for shifting the sleeve 52 between operational positions. In some embodiments, spring-loaded plungers or other mechanisms may be used in combination with corresponding detents or features to help temporarily secure the sleeve 52 at the different operational positions.

In an operational example, the sleeve 52 may be shifted hydraulically in a first direction indicated by arrow 62. However, the sleeve 52 may be shifted in an opposite direction based on electronic or pressure pulse signals received by a smart/intelligent system and/or other actuation system 60 coupled with sleeve 52 so as to shift the sleeve 52 in a second direction indicated by arrow 64. Accordingly, sliding movement of sleeve 52 along the interior of tubular section 44 may be selectively controlled to expose one, both, or neither of the ports 54, 56.

Figure 3:
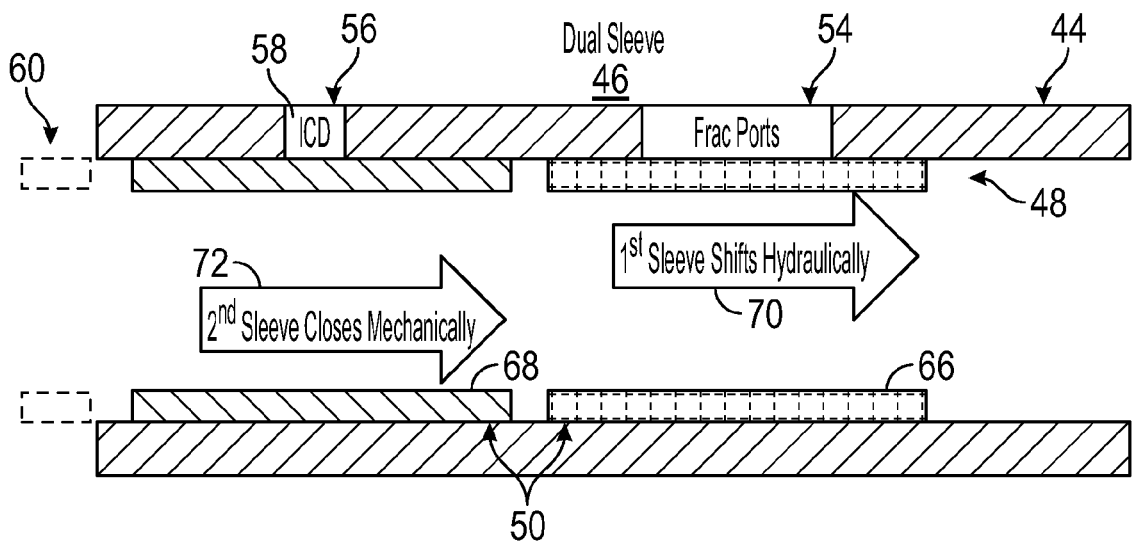
FIG. 3 is a schematic illustration of another example of a portion of a downhole completion having a tubular section and the corresponding shiftable tool operable to facilitate both fracturing operations and production operations, according to an embodiment of the disclosure.

Referring generally to FIG. 3, another embodiment of sleeve system 50 is illustrated. In this example, the sleeve system 50 comprises a plurality of sleeves, such as the pair of sleeves 66, 68. The first sleeve 66 is illustrated as positioned to close off fracturing port 54, and the second sleeve 68 is illustrated as positioned to close off production port 56. In this embodiment, the sleeves 66, 68 may be shifted along the interior of tubular section 44 via a variety of shifting mechanisms. For example, the first sleeve 66 may be constructed as a hydraulically actuated sleeve and the second sleeve 68 may be a mechanically actuated sleeve. In this example, the first sleeve 66 may be shifted hydraulically via a hydraulic actuator supplied with hydraulic fluid through hydraulic control lines. However, shifting of sleeve 66 also may be controlled via an intelligent completion device. The second sleeve 68 can be similarly actuated, although mechanical actuation may be provided by a shifting tool or other mechanical device.

According to an operational example, the first sleeve 66 and the second sleeve 68 may initially be positioned to close off the fracturing port 54 and the production port 56, respectively (see FIG. 3). Both ports 54, 56 may be closed during, for example, running-in-hole. Subsequently, first sleeve 66 may be actuated and shifted in the direction of arrow 70 so as to open fracturing port 54. A stimulation operation, e.g. a fracturing operation, may then be performed through the fracturing port 54. Upon completion of fracturing, the second sleeve 68 may be actuated and shifted in the direction of arrow 72 so as to open production port 56. This allows a flow of production fluid 36 into the surrounding geothermal formation 30. As described above, the production ports 56 located at the various well zones 46 may be sized to ensure a desired distribution of flow into the geothermal formation 30 along the well zones 46.

Figure 4:
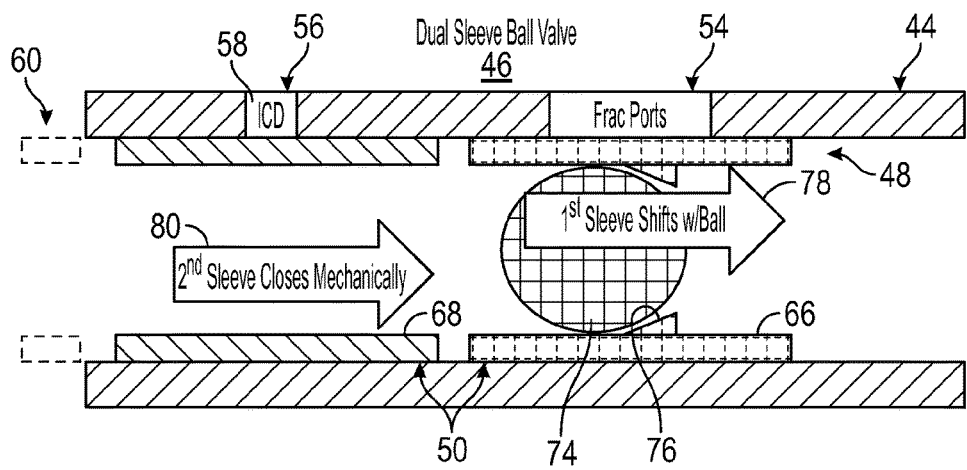
FIG. 4 is a schematic illustration of another example of a portion of a downhole completion having a tubular section and the corresponding shiftable tool operable to facilitate both fracturing operations and production operations, according to an embodiment of the disclosure.

Referring generally to FIG. 4, another embodiment of sleeve system 50 is illustrated. In this example, the sleeve system 50 again comprises a plurality of sleeves, such as the pair of sleeves 66, 68. The first sleeve 66 is illustrated as positioned to close off fracturing port 54, and the second sleeve 68 is illustrated as positioned to close off production port 56. In this embodiment, the first sleeve 66 may be constructed as a ball actuated sleeve and the second sleeve 68 may be a mechanically actuated sleeve. For example, the first sleeve 66 may be shifted by dropping a ball 74 which is received in a ball seat 76 of sleeve 66. The first sleeve 66 may be shifted by applying pressure along the interior of tubing string 42 and against ball 74 until the first sleeve 66 is shifted. The second sleeve 68 may be mechanically actuated by a shifting tool or other mechanical device.

According to an operational example, the first sleeve 66 and the second sleeve 68 may initially be positioned to close off the fracturing port 54 and the production port 56, respectively (see FIG. 4). Subsequently, first sleeve 66 may be actuated and shifted in the direction of arrow 78 by applying pressure against ball 74 so as to open fracturing port 54. A stimulation operation, e.g. a fracturing operation, may then be performed through the fracturing port 54. Upon completion of fracturing, the second sleeve 68 may be mechanically actuated and shifted in the direction of arrow 80 so as to open production port 56. This allows a flow of production fluid 36 into the surrounding geothermal formation 30. As described above, the production ports 56 located at the various well zones 46 may be sized to ensure a desired distribution of flow into the geothermal formation 30 along the well zones 46.

Figure 5:
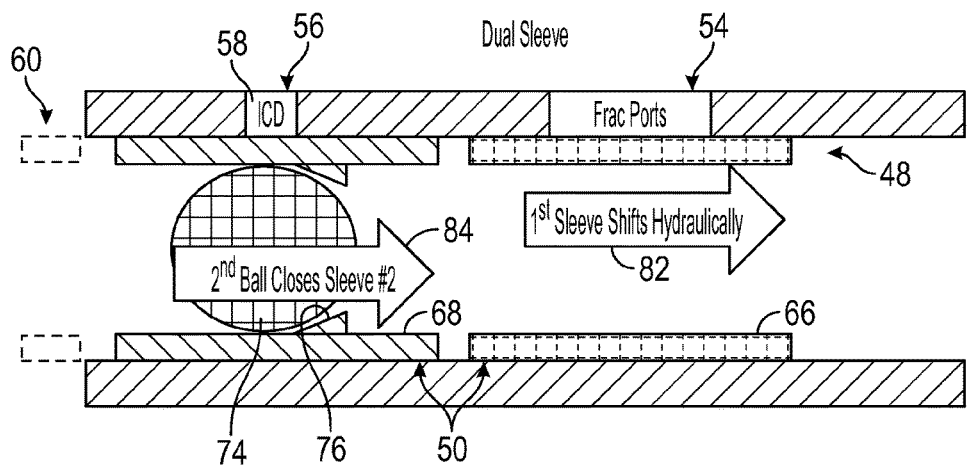
FIG. 5 is a schematic illustration of another example of a portion of a downhole completion having a tubular section and the corresponding shiftable tool operable to facilitate both fracturing operations and production operations, according to an embodiment of the disclosure.

Referring generally to FIG. 5, another embodiment of sleeve system 50 is illustrated. In this example, the sleeve system 50 again comprises a plurality of sleeves, such as the pair of sleeves 66, 68. The first sleeve 66 is illustrated as positioned to close off fracturing port 54, and the second sleeve 68 is illustrated as positioned to close off production port 56. In this embodiment, the first sleeve 66 may be constructed as a hydraulically actuated sleeve and the second sleeve 68 may be a ball actuated sleeve. For example, the first sleeve 66 may be shifted hydraulically via hydraulic fluid supplied through hydraulic control lines. However, shifting of sleeve 66 also may be controlled via an intelligent completion system, e.g. a smart trigger. The second sleeve 68 may be a ball actuated sleeve which is shifted by dropping the ball 74 which is received in corresponding ball seat 76 of second sleeve 68. The second sleeve 68 may be shifted by applying pressure along the interior of tubing string 42 and against ball 74 until the second sleeve 68 is shifted.

According to an operational example, the first sleeve 66 and the second sleeve 68 may initially be positioned to close off the fracturing port 54 and the production port 56, respectively (see FIG. 5). Subsequently, first sleeve 66 may be hydraulically actuated and shifted in the direction of arrow 82 so as to open fracturing port 54. A stimulation operation, e.g. a fracturing operation, may then be performed through the fracturing port 54. Upon completion of fracturing, the second sleeve 68 may be actuated and shifted in the direction of arrow 84 by applying pressure against ball 74 so as to open production port 56. This allows a flow of production fluid 36 into the surrounding geothermal formation 30. As described above, the production ports 56 located at the various well zones 46 may be sized to ensure a desired distribution of flow into the geothermal formation 30 along the well zones 46.

It should be noted that various types of actuating mechanisms and combinations of actuating mechanisms may be used for selectively actuating an individual sleeve 52 or a plurality of sleeves 66, 68. In some applications, a plurality of balls 74, e.g. balls of different diameters, may be used to actuate the plurality of sleeves 66, 68. However, various types of hydraulically actuated, electronically actuated, and/or otherwise actuated sleeves may be used to open and close the fracturing ports 54 and the production ports 56 throughout the well zones 46.

Multiple combinations of actuation methods may be utilized. Hydraulic actuation, ball actuation, mechanical shifting actuation, "smart trigger" actuation and/or other types of actuation may be utilized. Depending on the actuation mechanism, the actuation methods may vary from one tubular section 44 to the next. For example, it may be useful to utilize a less expensive ball actuation or mechanical actuation in a lower tubular section 44 while utilizing a "smart trigger" or control line based hydraulic actuation in an upper tubular section 44. However, many arrangements may be utilized to achieve the desired sequence of fracturing flow and production flow with a single tool, e.g. with a single sleeve system 50, at each well zone 46. Regardless of the specific actuation method, the method enables fracturing operations followed by production operations with a desired flow distribution, e.g. an evenly distributed flow, across multiple well zones 46.

It should be noted the combination of tubular sections 44 and corresponding sleeve systems 50 across multiple well zones 46 may be used in many types of wellbores and applications in which plural functionality and properly distributed flow across well zones is desired. For example, the sleeve systems 50 may be used to enable a variety of well stimulation operations followed by "even flow" production operations in many types of well systems. The unique approach described herein combines completion functions into a single tool, e.g. single sleeve system 50, for improved usability while providing multiple operational modes, e.g. off; hydraulic fracture mode; and "even flow" production mode. The different operational modes enable a user to hydraulically fracture a geothermal well and then to initiate an evenly distributed production fluid flow without having to use additional equipment or intervention.

In geothermal energy applications, the single tool approach provides a low-cost, efficient approach to preparing, e.g. fracturing, and utilizing a production fluid flow loop through the hot, geothermal formation 30. Depending on the specific parameters of a given operation and/or environment, the materials and structure of the tubular sections 44, sleeve systems 50, actuation/shifting systems 60 may vary. Additionally, various combinations of actuation systems 60 may be utilized to provide the desired sequencing of single sleeves 52 or plural sleeves 66, 68. The actuation systems as well as the structure of other components also may vary from one well zone to the next.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for use in a geothermal well, comprising:
 a geothermal well completion deployed downhole in a wellbore, the geothermal well completion comprising:
  a tubular section deployed in a well zone, the tubular section defining a bore and comprising a first port and a second port, wherein a flow control device oriented to control fluid outflow from the tubular section defines the second port;
  a screen configured to prevent proppant from entering the flow control device;
  a first sleeve disposed in the bore of the tubular section and selectively shiftable between a first position and a second position, wherein:
   in the first position of the first sleeve, the first sleeve prohibits fluid communication between the wellbore and the bore of the tubular section via the first port; and
   in the second position of the first sleeve, the first sleeve is shifted past the first port and the wellbore and the bore of the tubular section are in fluid communication via the first port; and
  a second sleeve disposed in the bore of the tubular section and selectively shiftable between a first position and a second position, wherein:
   in the first position of the second sleeve, the second sleeve prohibits fluid communication between the wellbore and the bore of the tubular section via the second port; and
   in the second position of the second sleeve, the second sleeve is shifted past the second port and the wellbore and the bore of the tubular section are in fluid communication via the second port.

2. The system of claim 1, wherein at least one of the first sleeve or the second sleeve is selectively shiftable from the first position to the second position and from the second position to the first position.

3. The system of claim 1, wherein the first port is larger in area than the second port.

4. A system comprising:
 a geothermal well system having an injection well completed with a geothermal well completion, geothermal well completion comprising:
  a tubing string having a plurality of tubular sections deployed along a plurality of corresponding well zones, wherein at least one tubular section of the plurality of tubular sections defines a bore and comprises a first port and a second port, and wherein a flow control device oriented to control fluid outflow from the at least one tubular section defines the second port;
  a screen configured to prevent proppant from entering the flow control device;
  a first sleeve disposed in the bore of the at least one tubular section selectively shiftable between a first position and a second position, wherein:
   in the first position of the first sleeve, the first sleeve prohibits fluid communication between a wellbore of the injection well and the bore of the at least one tubular section via the first port; and
   in the second position of the first sleeve, the first sleeve is shifted past the first port and the wellbore and the bore of the at least one tubular section are in fluid communication via the first port; and
  a second sleeve disposed in the bore of the at least one tubular section and selectively shiftable between a first position and a second position, wherein:
   in the first position of the second sleeve, the second sleeve prohibits fluid communication between the wellbore and the bore of the at least one tubular section via the second port; and in the second position of the second sleeve, the second sleeve is shifted past the second port and the wellbore and the bore of the at least one tubular section are in fluid communication via the second port.

5. The system of claim 4, wherein at least one of the first sleeve or the second sleeve is selectively shiftable from the first position to the second position and from the second position to the first position.

6. The system of claim 4, wherein at least one of the first sleeve or the second sleeve is shiftable via a smart trigger which receives control signals from a surface location.

7. A method comprising:
shifting a first sliding sleeve from a first position to a second position by hydraulically actuating the first sliding sleeve, the first sliding sleeve disposed in a bore of a tubular section disposed in a well zone of a geothermal injection well extending from a surface, wherein:
in the first position of the first sliding sleeve, the first sliding sleeve prohibits fluid communication between the well zone and the bore of the tubular section via a first port of the tubular section; and
in the second position of the first sliding sleeve, the first sliding sleeve is shifted past the first port and the well zone and the bore of the tubular section are in fluid communication via the first port; and
performing fracturing operations in the well zone through the first port;
shifting a second sliding sleeve disposed in the bore of the tubular from a first position to a second position by landing a ball in a seat of the second sliding sleeve and applying a pressure to the ball, wherein:
in the first position of the second sliding sleeve, the second sliding sleeve prohibits fluid communication between the well zone and the bore of the tubular section via a second port of the tubular section; and
in the second position of the second sliding sleeve, the second sliding sleeve is shifted past the second port and the well zone and the bore of the tubular section are in fluid communication via the second port; and
injecting a fluid through the tubular section and into the well zone via the second port, wherein a flow control device oriented to control fluid outflow from the tubular section defines the second port, and wherein a screen prevents proppant from entering the flow control device.

8. The method of claim 7, further comprising returning a portion of the injected fluid to the surface through at least one geothermal production well.

9. The method of claim 8, further comprising:
generating electricity at the surface with the portion of the injected fluid; and
injecting the portion of the injected fluid through the tubular section and into the well zone via the second port.

* * * * *